(12) United States Patent
Chang

(10) Patent No.: US 11,362,609 B2
(45) Date of Patent: Jun. 14, 2022

(54) ACTIVE SOUND GENERATION APPARATUS USING MOTOR

(71) Applicants: HYUNDAI MOTOR COMPANY, Seoul (KR); KIA MOTORS CORPORATION, Seoul (KR)

(72) Inventor: Kyoung Jin Chang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 141 days.

(21) Appl. No.: 16/871,470

(22) Filed: May 11, 2020

(65) Prior Publication Data

US 2021/0044236 A1 Feb. 11, 2021

(30) Foreign Application Priority Data

Aug. 9, 2019 (KR) .................. 10-2019-0097381

(51) Int. Cl.
*H02P 21/13* (2006.01)
*H02P 21/22* (2016.01)
(Continued)

(52) U.S. Cl.
CPC ............ *H02P 21/13* (2013.01); *B62D 5/0409* (2013.01); *B62D 5/0463* (2013.01); *G10K 15/04* (2013.01);
(Continued)

(58) Field of Classification Search
CPC ...... G10K 9/00; G10K 7/02; G10K 2210/121; G10K 15/04; G10L 21/0232; G10L 25/51;
(Continued)

(56) References Cited

U.S. PATENT DOCUMENTS 8,212,505 B2 * 7/2012 Nagashima ............. B60L 50/16
318/400.23
9,998,051 B2 * 6/2018 Meyer .................. B62D 5/0463
(Continued)

FOREIGN PATENT DOCUMENTS

JP 2005033861 A * 2/2005
KR 10-1526602 B1 6/2015

OTHER PUBLICATIONS

U.S. Notice of Allowance dated Mar. 4, 2021 issued in U.S. Appl. No. 16/856,837.

*Primary Examiner* — Said Bouziane
(74) *Attorney, Agent, or Firm* — Morgan, Lewis & Bockius LLP

(57) ABSTRACT

Disclosed is an active sound generation apparatus using a motor, the apparatus including a target sound generating signal generator configured to select the target sound and to generate a current command signal for driving the motor to generate the target sound, a current sensor configured to sense phase current of the motor, a motor controller configured to generate a voltage command for driving the motor to generate the target sound and to control driving of the motor based on a current command signal generated by the target sound generating signal generator, the phase current of the motor sensed by the current sensor, and a counter electromotive force compensation value of the motor, and a radiated noise generator configured to generate the target sound using vibration generated from the motor driven by the motor controller.

10 Claims, 8 Drawing Sheets

(51) Int. Cl.
*H02P 27/12* (2006.01)
*B62D 5/04* (2006.01)
*G10L 25/51* (2013.01)
*G10K 15/04* (2006.01)
*H04R 3/04* (2006.01)
*G10L 21/0232* (2013.01)

(52) U.S. Cl.
CPC .......... *G10L 21/0232* (2013.01); *G10L 25/51* (2013.01); *H02P 21/22* (2016.02); *H02P 27/12* (2013.01); *H04R 3/04* (2013.01)

(58) Field of Classification Search
CPC .......... H02P 27/12; H02P 29/50; H02P 21/13; H04R 3/04
See application file for complete search history.

(56) References Cited

U.S. PATENT DOCUMENTS

| | | | |
|---|---|---|---|
| 2005/0073280 A1* | 4/2005 | Yoshinaga | H02P 29/50 |
| | | | 318/727 |
| 2019/0252972 A1* | 8/2019 | Minaki | H02M 1/38 |
| 2020/0365133 A1 | 11/2020 | Pignier et al. | |
| 2020/0388267 A1 | 12/2020 | Bastyr | |

* cited by examiner

FIG. 7
(BEFORE CIRCUIT OF NOISE MANAGEMENT UNIT IS APPLIED)
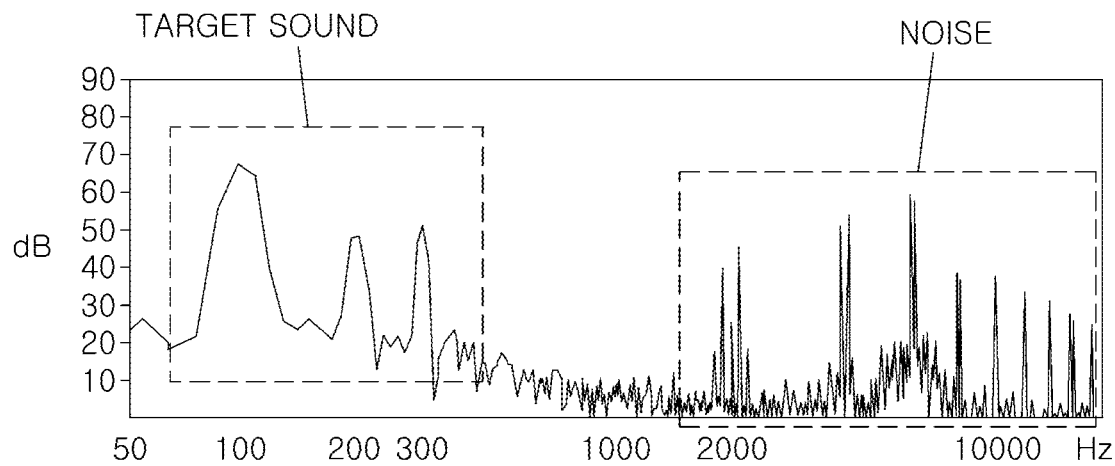
(AFTER CIRCUIT OF NOISE MANAGEMENT UNIT IS APPLIED)
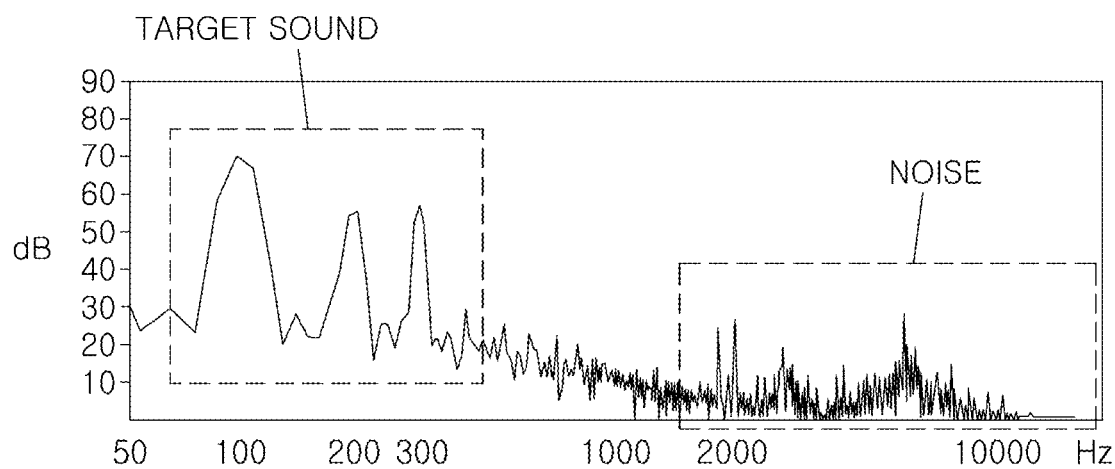

ACTIVE SOUND GENERATION APPARATUS USING MOTOR

CROSS-REFERENCE TO RELATED APPLICATION

This application claims the priority benefit of Korean Patent Application No. 10-2019-0097381, filed on Aug. 9, 2019 in the Korean Intellectual Property Office, the disclosure of which is incorporated herein by reference in its entirety.

BACKGROUND OF THE INVENTION

1. Field of the Invention

The present disclosure relates to an active sound generation apparatus using a motor, and more particularly, an active sound generation apparatus using a motor for actively generating desired sound by controlling a permanent magnet synchronous motor (PMSM).

2. Description of the Related Art

Recently, an apparatus for generating desired sound during traveling as if the sound is generated from an exhaust system using a speaker or a vibration actuator has been actively applied to a vehicle. However, such technology has a limit in that an external amplifier or a separate actuator for sound control needs to be added, increasing the overall cost and weight. Accordingly, according to trends, there has been a need to develop technology for reducing the cost and weight of a vehicle by generating desired sound using components installed in the vehicle without adding a separate external amplifier or actuator.

SUMMARY OF THE INVENTION

Therefore, the present disclosure has been made in view of the above problems, and it is an object of the present disclosure to provide an active sound generation apparatus for controlling a motor installed in vehicle to actively generate desired target sound while the vehicle travels without adding a separate actuator or external amplifier.

In accordance with an aspect of the present disclosure, the above and other objects can be accomplished by the provision of an active sound generation apparatus using a motor, for actively generating desired target sound by controlling a three-phase motor installed in a vehicle. The apparatus may include a target sound generating signal generator configured to select the target sound and to generate a current command signal for driving the motor to generate the target sound, a current sensor configured to sense phase current of the motor, a motor controller configured to generate a voltage command for driving the motor to generate the target sound and to control driving of the motor based on a current command signal generated by the target sound generating signal generator, actual current information of a motor, sensed by the current sensor, and a counter electromotive force compensation value of the motor, and a radiated noise generator configured to generate the target sound using vibration generated from the motor driven by the motor controller.

The target sound generating signal generator may include at least one of a target sound selector configured to select an axis to be used to control the motor to generate the target sound from a d axis and a q axis of the motor, a target sound selector configured to select the target sound, a command signal generator configured to select a sampling frequency based on a frequency of the selected target sound and to generate a command signal for generating the target sound, a digital-analog converter configured to convert a digital signal generated by the command signal generator to an analog signal, a low pass filter configured to remove a low-frequency command of the signal converted by the digital-analog converter, or a noise management unit configured to detect whether a signal output from the low pass filter contains noise and to adjust the sampling frequency and a gain value of the low pass filter to reduce noise when noise is detected.

The motor controller may include at least one of a d-q converter configured to convert three-phase current of the motor, measured by the current sensor, to d-axis and q-axis current, a d-q compensator configured to compensate for counter electromotive force of a d axis and a q axis of the motor, a voltage command generator configured to drive the motor to generate a d-axis or q-axis voltage command for generating the target sound based on the current command value of the d axis and the q axis input from the target sound generating signal generator, an actual current value of the d axis and the q axis converted by the d-q converter, and a compensation value through the d-q compensator, a d-q inverse-converter configured to convert a voltage command signal generated by the voltage command generator to three phases, or a pulse width modulation (PWM) controller configured to control a PWM signal based on the three-phase voltage command signal converted by the d-q inverse-converter.

The apparatus may further include a position sensor configured to sense a position of a rotor of the motor; and an angular velocity extraction unit configured to extract angular velocity of the motor based on the sensed position of the rotor, wherein the d-q compensator may compensate for the counter electromotive force of the d axis and the q axis of the motor based on the angular velocity of the motor, extracted by the angular velocity extraction unit, inductance of the d axis and the q axis, the current command value of the d axis and the q axis, and magnetic flux of the motor.

The PWM controller may be space vector pulse width modulation (SVPWM) or sinusoidal pulse width modulation (SPWM).

The apparatus may further include a an inverter including a plurality of switching devices and configured to drive the motor by turning on/off the switching device according to the PWM signal output from the PWM controller to supply alternating current (AC) power to the motor.

The motor may be motor driven power steering (MDPS) that is connected to an axis of a steering wheel installed in the vehicle and assists steering of the steering wheel.

The radiated noise generator may include a mounting bracket configured to fix the motor and the axis of the steering wheel, a main body including one or more radiated noise generating panels configured to generate radiated noise using vibration generated from the motor, and one or more rigidity adjusting ribs included in the radiated noise generating panel and configured to adjust rigidity of the radiated noise generating panel to adjust a natural frequency of the radiated noise generating panel.

The radiated noise generator may further include one or more mass adjusting holes that are formed in the radiated noise generating panel and adjusts mass of the radiated noise generating panel to adjust a natural frequency of the radiated noise generating panel.

The radiated noise generating panel may have a smaller thickness than a thickness of the mounting bracket.

The radiated noise generating panel may be formed of a plastic or metallic material.

BRIEF DESCRIPTION OF THE DRAWINGS

The above and other objects, features and other advantages of the present disclosure will be more clearly understood from the following detailed description taken in conjunction with the accompanying drawings, in which:

FIG. 7 illustrates an experimental result in which noise is reduced by a noise management unit in an active sound generation apparatus using a motor according to an embodiment of the present disclosure.

DETAILED DESCRIPTION OF THE PREFERRED EMBODIMENTS

Figure 1:
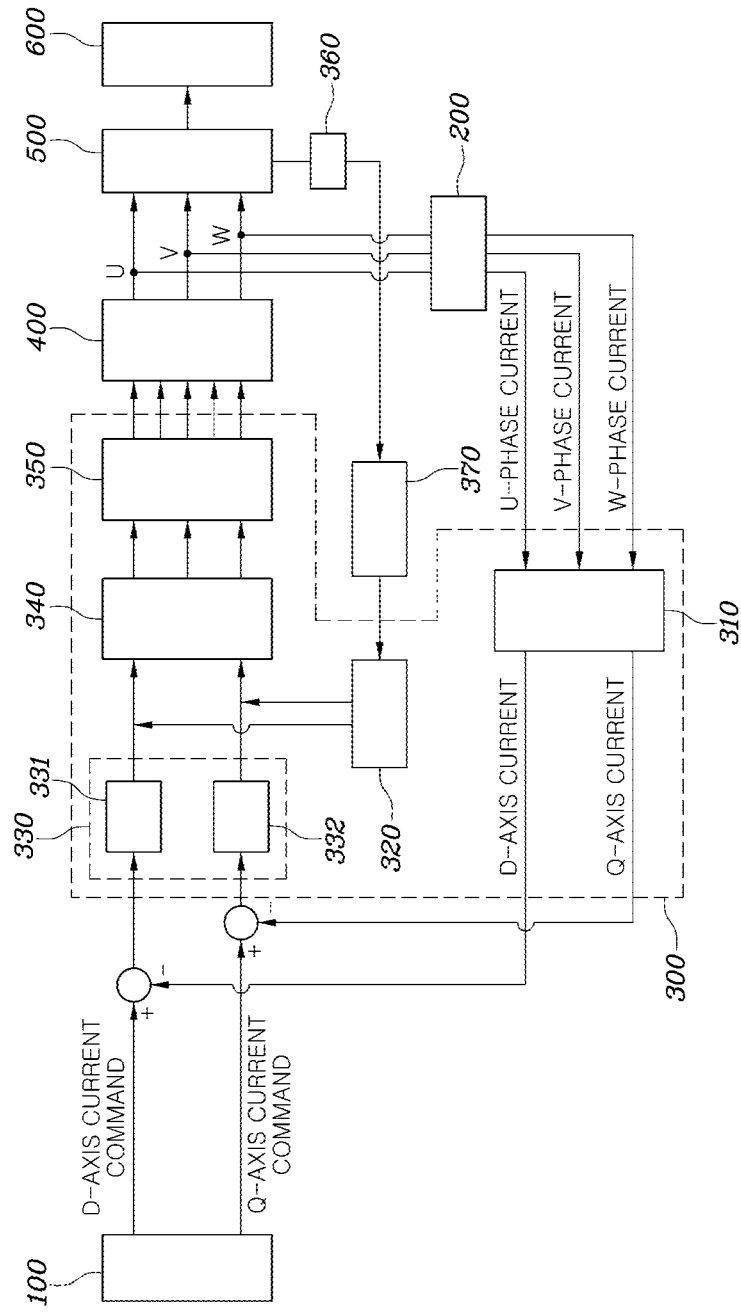
FIG. 1 is a block diagram of an entire configuration of an active sound generation apparatus using a motor according to an embodiment of the present disclosure.

Hereinafter, exemplary embodiments will now be described more fully with reference to the accompanying drawings. Terms or words used herein shall not be limited to having common or dictionary meanings, and have the meanings corresponding to technical aspects of the embodiments of the present disclosure so as to most suitably express the embodiments of the present disclosure.

Accordingly, embodiments described in the specification and configurations shown in the drawings are merely an exemplary embodiment of the present disclosure and do not represent all technical ideas, and thus it is to be appreciated that various equivalents replacing these are made when the application is filed.

Figure 2:
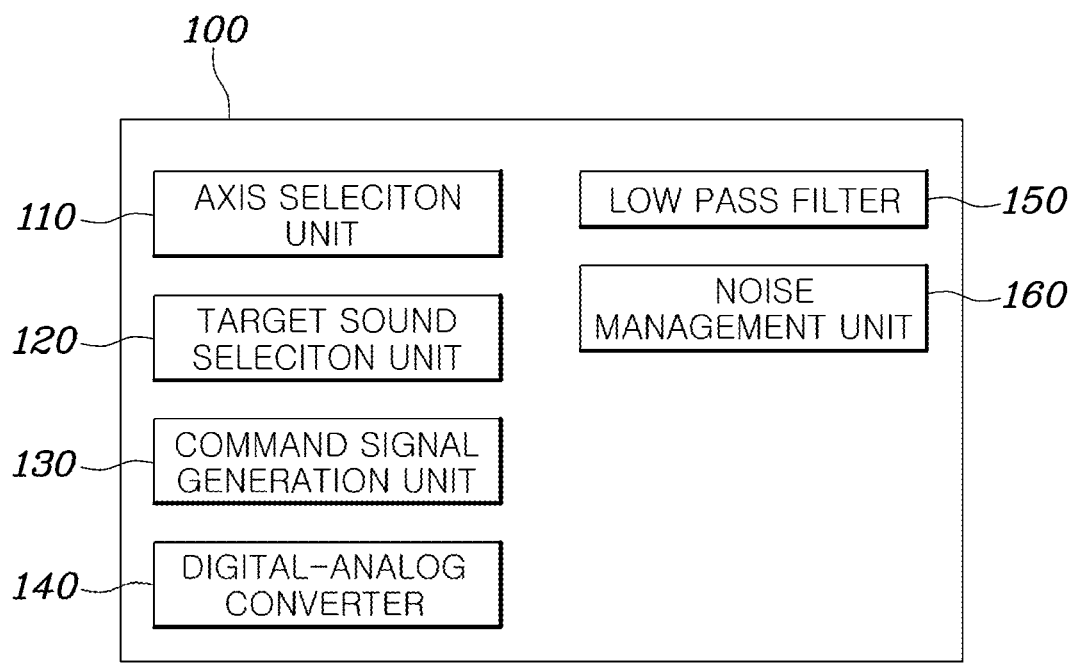
FIG. 2 is a block diagram showing a detailed configuration of a target sound generating signal generator in an active sound generation apparatus using a motor according to an embodiment of the present disclosure.
Figure 3:
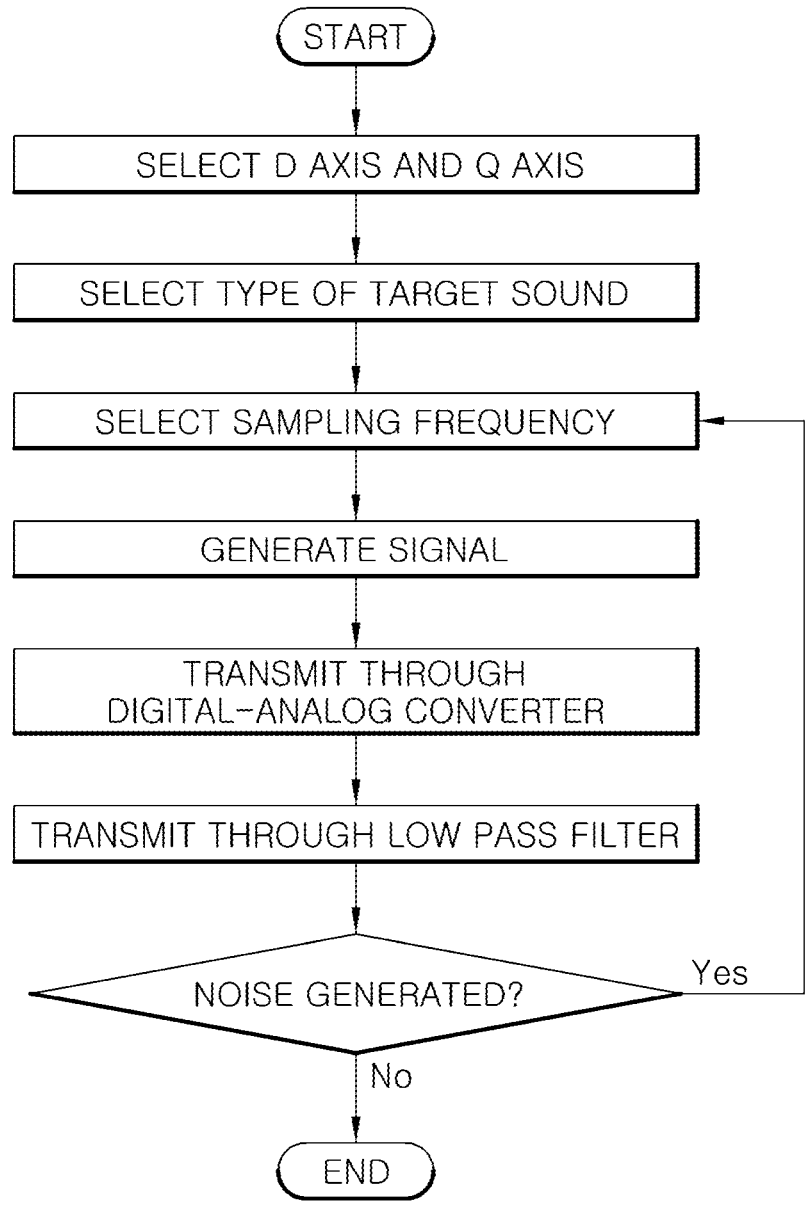
FIG. 3 is a flowchart showing a procedure of generating a target sound generating signal by a target sound generating signal generator of an active sound generation apparatus using a motor according to an embodiment of the present disclosure.
Figure 4:
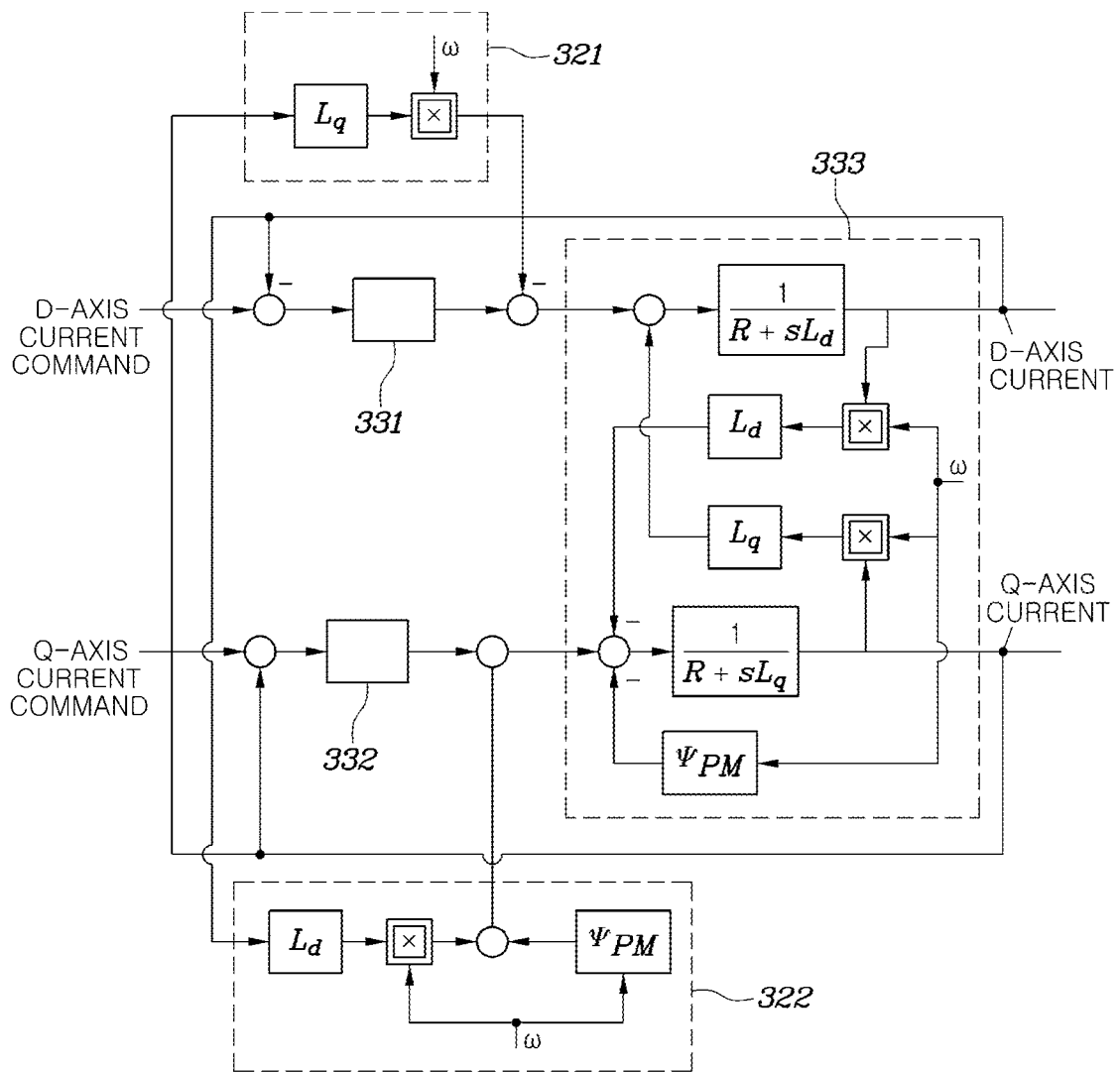
FIG. 4 is a diagram showing a detailed configuration of a motor controller in an active sound generation apparatus using a motor according to an embodiment of the present disclosure.
Figure 5:
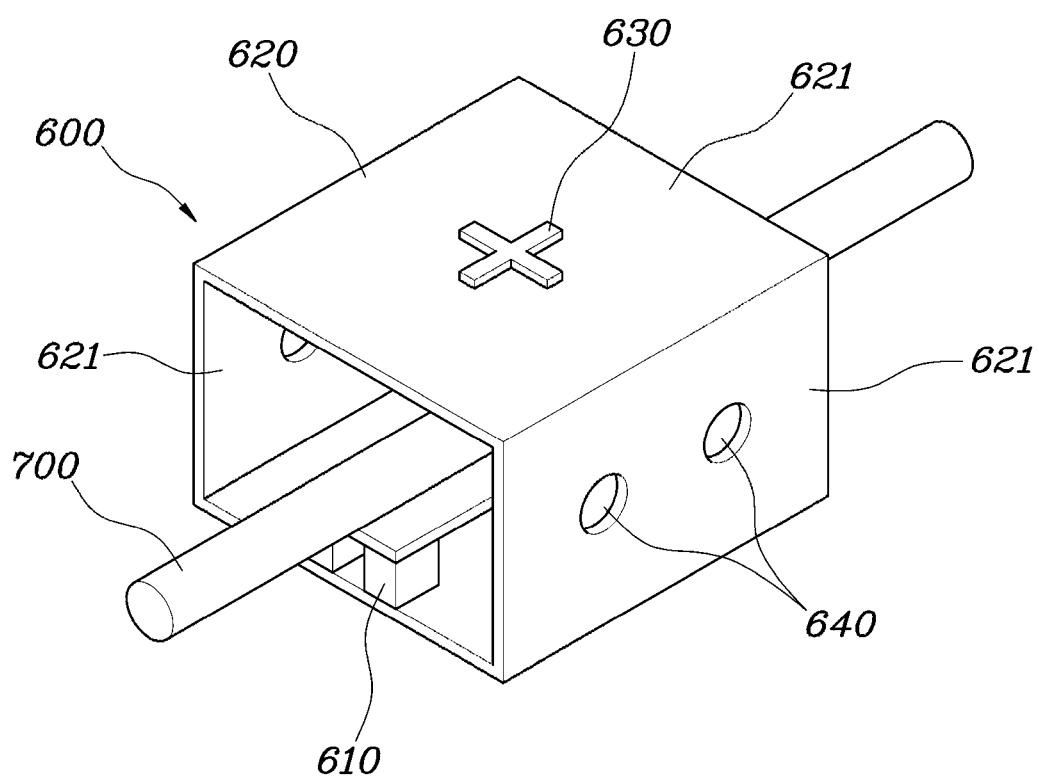
FIG. 5 is a perspective view of a radiated noise generator in an active sound generation apparatus using a motor according to an embodiment of the present disclosure.
Figure 6:
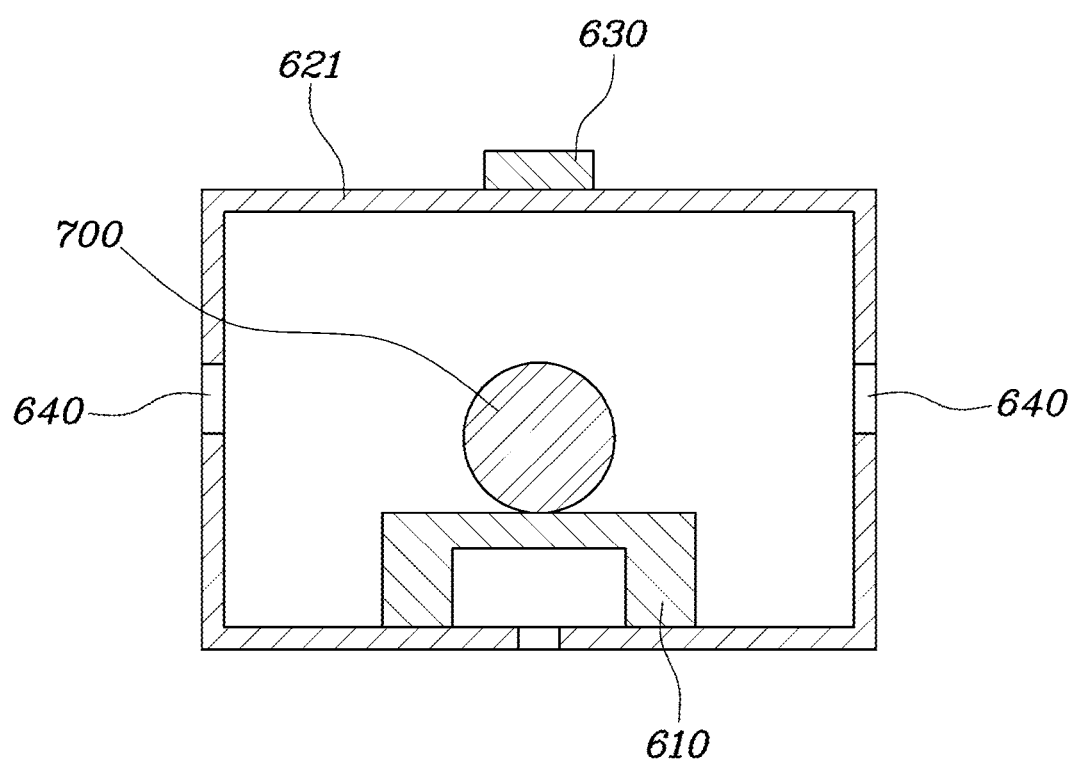
FIG. 6 is a cross-sectional view of a radiated noise generator in an active sound generation apparatus using a motor according to an embodiment of the present disclosure.

FIG. 1 is a block diagram of an entire configuration of an active sound generation apparatus using a motor according to an embodiment of the present disclosure. FIG. 2 is a block diagram showing a detailed configuration of a target sound generating signal generator. FIG. 3 is a flowchart showing a procedure of generating a target sound generating signal by a target sound generating signal generator. FIG. 4 is a diagram showing a detailed configuration of a motor controller. FIG. 5 is a perspective view of a radiated noise generator. FIG. 6 is a cross-sectional view of a radiated noise generator. FIG. 7 illustrates an experimental result in which noise is reduced by a noise management unit.

As shown in FIG. 1, an active sound generation apparatus using a motor according to an embodiment of the present disclosure may be an apparatus for controlling a three-phase motor installed in a vehicle to actively generate desired target sound and may include a target sound generating signal generator 100, a current sensor 200, a motor controller 300, an inverter 400, a motor 500, and a radiated noise generator 600.

The target sound generating signal generator 100 may select target sound to be generated by driving the motor 500 and may generate a current command signal for driving the motor 500 to generate the target sound. In detail, referring to FIG. 2, the target sound generating signal generator 100 may include at least one of an axis selector 110, a target sound selector 120, a command signal generator 130, a digital-analog converter 140, a low pass filter 150, or a noise management unit 160.

In more detail, the axis selector 110 may select an axis to be used when the motor 500 is controlled to generate target sound from a d axis or a q axis of the motor 500. Here, the d axis and the q axis of the motor 500 may refer to axes in centrifugal force direction and rotation direction of the motor 500 and may refer to axes obtained by converting the three-phase inverter 400 to be described below to two orthogonal coordinate axes in order to control the motor 500.

In some embodiments, the q axis needs to be used to perform an original function of the motor 500 via torque control of the motor 500, and thus the axis selector 110 may select the d axis to be used to vibrate and control the motor 500 to generate target sound. However, according to another embodiment, the axis selector 110 may also select the q axis to be used to vibrate and control the motor 500 to generate the target sound.

When the axis selector 110 selects an axis to be used to control the motor 500 to generate target sound, the target sound selector 120 may select the target sound to be generated via vibration of the motor 500. Here, the target sound may use various signals, and in some embodiments, may include time data of music, one specific frequency, a sine wave formed by coupling a plurality of specific frequencies, a sweep sine wave with a changed frequency, or the like. However, this is merely an embodiment and the target sound is not limited thereto.

When the target sound selector 120 selects target sound, the command signal generator 130 may select a sampling frequency based on a frequency of the selected target sound and may generate a command signal for generating the corresponding target sound. In some embodiments, when the axis selector 110 selects the d axis to be sued to control the motor 500, the command signal generator 130 may generate a d-axis current command signal for generating the corresponding target sound. In another embodiment, when the axis selector 110 selects the q axis to be used to control the motor 500, the command signal generator 130 may generate a q-axis current command signal for generating the corresponding target sound.

In detail, when sampling a sampling frequency, the command signal generator 130 may select a sampling frequency that is a minimum of five times greater than a frequency of a target sound to be embodied. Here, the sampling frequency that is a minimum of five times greater than a frequency of the target sound may be selected for the following reasons. When the selected sampling frequency is excessively small, a signal is not capable of appropriately following a target sound signal when passing through the digital-analog converter 140 and a signal waveform is distorted and a problem in terms of image noise in the case of an integer multiple of (sampling frequency±target sound frequency) occurs, and thus, to overcome the problem, according to the present disclosure, the sampling frequency that is a minimum of five times greater than the target sound frequency may be selected.

The digital-analog converter 140 may convert a digital signal generated by the command signal generator 130 to an analog signal, and the low pass filter 150 may remove a low-frequency component of signal converted by the digital-analog converter 140. A detailed configuration and operational principle of the digital-analog converter 140 and the low pass filter 150 are known technology, and thus a detailed description thereof will be omitted.

The noise management unit 160 may detect whether a signal output from the low pass filter 150 contains noise, and when noise is detected, the noise management unit 160 may adjust the sampling frequency and a gain value of the low pass filter 150 and reduce noise. In detail, when noise is detected from the signal output from the low pass filter 150, the noise management unit 160 may repeatedly perform the aforementioned procedure as shown in FIG. 3 until noise is reduced up to a predetermined level while further increasing the sampling frequency generated by the command signal generator 130 or increasing the gain value of the low pass filter 150. As such, according to the present disclosure, when noise is detected from the signal output from the low pass filter 150, the noise management unit 160 may adjust the sampling frequency and the gain value of the low pass filter 150 to reduce noise, and thus may output a target sound generating command signal with reduced noise as shown in FIG. 7. In detail, referring to FIG. 7, before the noise management unit 160 is applied, image noise with a size of a minimum of 61 dB in an integer multiple of (sampling frequency±target sound frequency) is generated as shown in a left diagram, but the noise management unit 160 may be applied to reduce image noise of a maximum of 31 dB as shown in a right diagram.

The current sensor 200 may sense current of each phase of the motor 500. The current of each phase sensed by the current sensor 200 may be input to a d-q converter 310 and may be converted to d-axis and q-axis current.

The motor controller 300 may generate a voltage command for driving the motor 500 and may control driving of the motor 500 in order to generate the target sound based on a current command signal generated by the target sound generating signal generator 100, actual current information of the motor 500 sensed by the current sensor 200, and a counter electromotive force compensation value of the motor 500.

In detail, referring to FIGS. 1 and 4, the motor controller 300 may include at least one of the d-q converter 310, a d-q compensator 320, a voltage command generator 330, a d-q inverse-converter 340, or a PWM controller 350. The motor controller 300 may further include a position sensor 360 for sensing a position of a rotor of the motor 500 and an angular velocity extraction unit 370 for extracting angular velocity of the motor 500 based on the sensed position of the rotor. In some embodiments, a hall sensor, an encoder, a resolver, or the like may be used as the position sensor 360 for sensing the position of the rotor.

In more detail, the d-q converter 310 may convert the three-phase current of the motor 500 measured by the current sensor 200 to d-axis and q-axis current. Phase conversion of three-phase current of the motor 500 to d-axis and q-axis current is known technology, and thus a detailed description thereof will be omitted.

The d-q compensator 320 may compensate for counter electromotive force of the d axis and the q axis of the motor 500. In detail, the d-q compensator 320 may compensate the counter electromotive force of the d axis and the q axis of the motor 500 based on angular velocity of the motor 500 extracted by the angular velocity extraction unit 370, inductance of the d axis and the q axis, a current command value of the d axis and the q axis, and magnetic flux of the motor.

In detail, the d-q compensator 320 may be a conversion compensator and may compensate for the counter electromotive force of the d axis and the q axis of the motor 500. Here, the d-q compensator 320 may include a d-axis compensator 321 and a q-axis compensator 322. In more detail, the counter electromotive force compensation value of the d axis and the q axis of the motor 500 may be calculated according to Equation 1 below.

$$V_{d\_ref\_ff} = -\omega_r L_q i_{q\_ref}$$

$$V_{q\_ref\_ff} = \omega_r (L_d i_{d\_ref} + \Psi_{pm}) \quad \text{[Equation 1]}$$

Here, $V_{d\_ref\_ff}$: voltage command value of d-axis conversion compensator, $V_{q\_ref\_ff}$: voltage command value of q-axis conversion compensator, $\omega_r$: motor angular velocity, $L_q$, $L_d$: inductance of q axis and d axis, $i_{q\_ref}$, $i_{d\_ref}$: current command values of q axis and d axis, and $\Psi_{pm}$: magnetic flux of motor.

The voltage command generator 330 may drive the motor 500 and may generate a d-axis or q-axis voltage command for generating target sound based on the current command value of the d axis and the q axis input from the target sound generating signal generator 100, an actual current value of the d axis and the q axis converted by the d-q converter 310, and a compensation value through the d-q compensator 320 and may generate a d-axis or q-axis voltage command for generating the target sound.

In detail, the voltage command generator 330 may include proportional integral controllers 331 and 332 for performing proportional integral control on the current command value of the d axis and the q axis input from the target sound generating signal generator 100, and the actual current value of the d axis and the q axis converted by the d-q converter 310. In this case, the voltage command generator 330 may include each of the d-axis and q-axis proportional integral controllers 331 and 332.

In addition, as shown in FIG. 4, in the case of the d axis, the voltage command generator 330 may input, to an RL circuit of the motor 500, a corresponding value obtained by subtracting the counter electromotive force compensation value of the d axis derived through the d-q compensator 320 from an output value of the d-axis proportional integral controller 331 to drive the motor 500 and thus may generate a d-axis voltage command signal for generating target sound.

As shown in FIG. 4, in the case of the q axis, the voltage command generator 330 may input, to the RL circuit 333 of the motor 500, a corresponding value obtained by adding the counter electromotive force compensation value of the q axis derived through the d-q compensator 320 to an output value of the q-axis proportional integral controller 332, to drive the motor 500 and thus, may generate a q-axis voltage command signal for generating target sound.

The d-q inverse-converter 340 may convert a voltage command signal generated by the voltage command generator 330 to three phases. The d-q inverse-converter 340 may inversely convert two phases of d-axis or q-axis voltage command signals generated by the voltage command generator 330 to a signal of a three-phase coordinate system in order to apply the signals to the motor 500. Here, conversion of the two phases of d-axis or q-axis signals to a three-phase signal is known technology, and thus a detailed description thereof will be omitted.

A PWM controller 350 may control a PWM signal based on the three-phase voltage command signal converted by the d-q inverse-converter 340.

In detail, the PWM controller 350 may generate and control a PWM signal applied to a switching device included in the inverter 400, which will be described below, based on the three-phase voltage command signal output from the d-q inverse-converter 340 to input desired current to the motor 500. In some embodiments, the PWM controller 350 may be space vector pulse width modulation (SVPWM) or sinusoidal pulse width modulation (SPWM). Generation and control of the SVPWM or the SPWM are known technology, and thus a detailed description thereof will be omitted.

The inverter 400 may include a plurality of switching devices, and the switching device may be turned on/off according to the PWM signal output from the PWM controller 350, and thus alternating power may be supplied to the motor 500 to drive the motor 500.

The motor 500 may be a permanent magnet synchronous motor (PMSM) and may be a motor that is connected to a steering wheel axis 700 installed in a vehicle to assist steering of the steering wheel. In some embodiments, the motor 500 may be motor driven power steering (MDPS).

The radiated noise generator 600 may generate target sound using vibration generated from the motor 500 driven by the motor controller 300. In detail, referring to FIGS. 5 and 6, the radiated noise generator 600 may include a mounting bracket 610 for fixing the motor 500 and the steering wheel axis 700, a main body 620 including one or more radiated noise generating panels 621 for generating radiated noise using vibration generated from the motor 500, and one or more rigidity adjusting ribs 630 that is included in the radiated noise generating panel 621 and adjusts the rigidity of the radiated noise generating panel 621 to adjust a natural frequency of the radiated noise generating panel 621. The radiated noise generator 600 may further include one or more mass adjusting holes 640 that are formed in the radiated noise generating panel 621 and adjusts the mass of the radiated noise generating panel 621 to adjust a natural frequency of the radiated noise generating panel 621. Here, the radiated noise generating panel 621 may be formed of a plastic or metallic material.

In general, the natural frequency of a structure or the like has characteristics whereby the natural frequency is proportional to the rigidity of the structure and is inversely proportional to the mass of the structure. According to the present disclosure, the rigidity or mass of the radiated noise generating panel 621 may be adjusted to adjust the natural frequency of the radiated noise generating panel 621, and thus may generate desired target sound. The number, size, position, and the like of the rigidity adjusting ribs 630 and the mass adjusting holes 640 that are formed on the radiated noise generating panel 621 are not limited and may be changed depending on the selected target sound.

The thickness of the radiated noise generating panel 621 may be smaller than the thickness of the mounting bracket 610. Here, the radiated noise generating panel 621 may have a smaller thickness than that of the mounting bracket 610 in order to increase surface radiation efficiency of the radiated noise generator 600. In detail, in order to amplify sound in the radiated noise generator 600, the radiated noise generator 600 is preferably designed in such a way that dynamic impedance of the radiated noise generator 600 is lower than the mounting bracket 610 to which vibration of the motor 500 is transferred. To this end, according to the present disclosure, the thickness of the radiated noise generating panel 621 may be smaller than the thickness of the mounting bracket 610, and thus radiation efficiency of a surface of the radiated noise generator 600, that is, the radiated noise generating panel 621. In some embodiments, the radiated noise generating panel 621 may be formed with a thickness equal to or less than ½ of the thickness of the mounting bracket 610.

Figure 8:
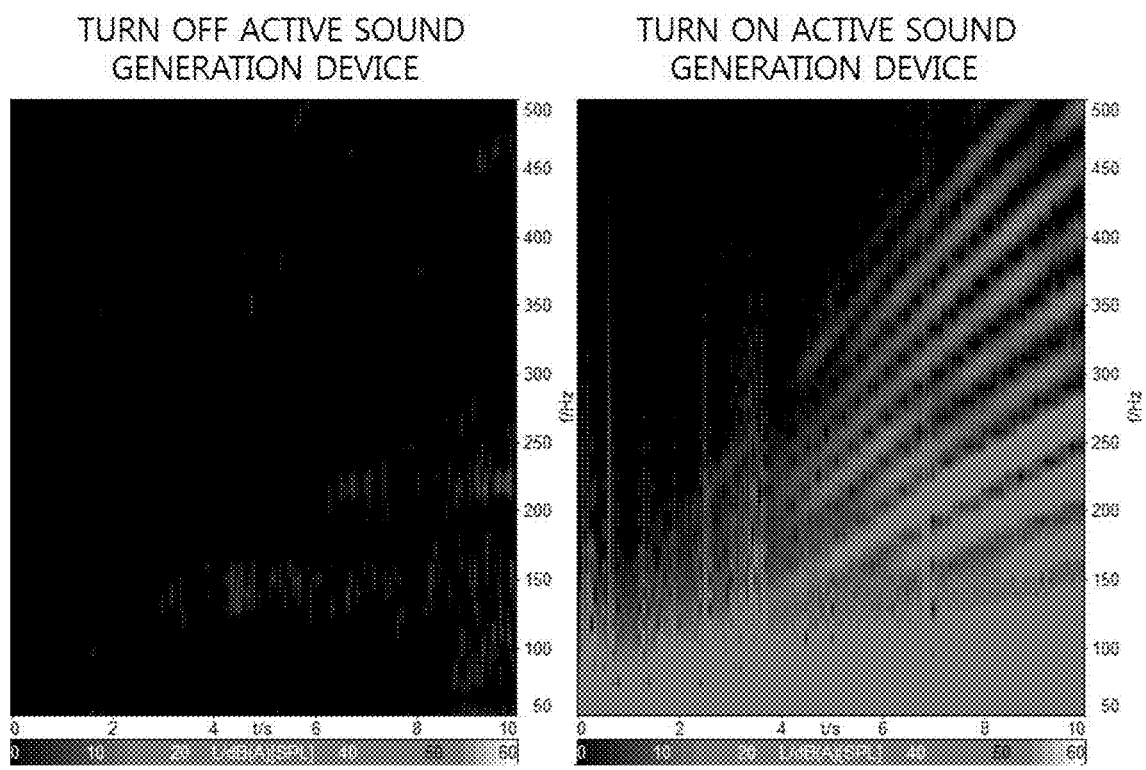
FIG. 8 illustrates an experimental result in which target sound is checked to be generated through an active sound generation apparatus using a motor according to an embodiment of the present disclosure.

FIG. 8 illustrates an experimental result in which target sound is checked to be generated through an active sound generation apparatus using a motor according to an embodiment of the present disclosure. As such, according to the present disclosure, a motor installed in a vehicle may be controlled without adding a separate actuator or external amplifier, and thus desired target sound may be actively generated while a vehicle travels as shown in FIG. 8.

According to the present disclosure, a motor installed in a vehicle may be controlled without adding a separate actuator and external amplifier, and thus desired target sound may be actively generated while a vehicle travels, thereby reducing overall weight and cost.

What is claimed is:

1. An active sound generation apparatus using a motor, for actively generating desired target sound by controlling a three-phase motor installed in a vehicle, the apparatus comprising:
    a target sound generating signal generator configured to select the target sound and to generate a current command signal for driving the motor to generate the target sound;
    a current sensor configured to sense phase current of the motor;
    a motor controller configured to generate a voltage command for driving the motor to generate the target sound and to control driving of the motor based on a current command signal generated by the target sound generating signal generator, the phase current of the motor sensed by the current sensor, and a counter electromotive force compensation value of the motor; and
    a radiated noise generator configured to generate the target sound using vibration generated from the motor driven by the motor controller,
    wherein the target sound generating signal generator includes at least one of:
    an axis selector configured to select an axis to be used to control the motor to generate the target sound from a d axis and a q axis of the motor;
    a target sound selector configured to select the target sound;
    a command signal generator configured to select a sampling frequency based on a frequency of the selected target sound and to generate a command signal for generating the target sound;
    a digital-analog converter configured to convert a digital signal generated by the command signal generator to an analog signal;
    a low pass filter configured to remove a low-frequency command of the signal converted by the digital-analog converter; or
    a noise management unit configured to detect whether a signal output from the low pass filter contains noise and to adjust the sampling frequency and a gain value of the low pass filter to reduce noise when noise is detected.

2. The apparatus of claim 1, wherein the motor controller includes at least one of:
- a d-q converter configured to convert three-phase current of the motor, measured by the current sensor, to d-axis and q-axis current;
- a d-q compensator configured to compensate for counter electromotive force of a d axis and a q axis of the motor;
- a voltage command generator configured to drive the motor to generate a d-axis or q-axis voltage command for generating the target sound based on the current command value of the d axis and the q axis input from the target sound generating signal generator, a current value of the d axis and the q axis converted by the d-q converter, and a compensation value through the d-q compensator;
- a d-q inverse-converter configured to convert a voltage command signal generated by the voltage command generator to three phases; or
- a pulse width modulation (PWM) controller configured to control a PWM signal based on the three-phase voltage command signal converted by the d-q inverse-converter.

3. The apparatus of claim 2, wherein the motor controller further includes:
- a position sensor configured to sense a position of a rotor of the motor; and
- an angular velocity extraction unit configured to extract angular velocity of the motor based on the sensed position of the rotor,
- wherein the d-q compensator compensates for the counter electromotive force of the d axis and the q axis of the motor based on the angular velocity of the motor, extracted by the angular velocity extraction unit, inductance of the d axis and the q axis, the current command value of the d axis and the q axis, and magnetic flux of the motor.

4. The apparatus of claim 2, wherein the PWM controller is space vector pulse width modulation (SVPWM) or sinusoidal pulse width modulation (SPWM).

5. The apparatus of claim 2, further comprising:
- an inverter including a plurality of switching devices and configured to drive the motor by turning on/off the switching device according to the PWM signal output from the PWM controller to supply alternating current (AC) power to the motor.

6. The apparatus of claim 1, wherein the motor is motor driven power steering (MDPS) that is connected to an axis of a steering wheel installed in the vehicle and assists steering of the steering wheel.

7. The apparatus of claim 6, wherein the radiated noise generator includes:
- a mounting bracket configured to fix the motor and the axis of the steering wheel;
- a main body including one or more radiated noise generating panels configured to generate radiated noise using vibration generated from the motor; and
- one or more rigidity adjusting ribs included in the radiated noise generating panel and configured to adjust rigidity of the radiated noise generating panel to adjust a natural frequency of the radiated noise generating panel.

8. The apparatus of claim 7, wherein the radiated noise generator further includes one or more mass adjusting holes that are formed in the one or more radiated noise generating panels and adjusts mass of the one or more radiated noise generating panels to adjust a natural frequency of the one or more radiated noise generating panels.

9. The apparatus of claim 7, wherein the one or more radiated noise generating panels have a smaller thickness than a thickness of the mounting bracket.

10. The apparatus of claim 7, wherein the one or more radiated noise generating panels are formed of a plastic or metallic material.

* * * * *